US012416750B2

(12) United States Patent
Higuchi et al.

(10) Patent No.: US 12,416,750 B2
(45) Date of Patent: Sep. 16, 2025

(54) LIQUID CRYSTAL OPTICAL ELEMENT AND MANUFACTURING METHOD OF THE SAME

(71) Applicant: Japan Display Inc., Tokyo (JP)

(72) Inventors: Ayaka Higuchi, Tokyo (JP); Shinichiro Oka, Tokyo (JP); Yasushi Tomioka, Tokyo (JP); Koichi Igeta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/827,960

(22) Filed: Sep. 9, 2024

(65) Prior Publication Data

US 2024/0427066 A1    Dec. 26, 2024

Related U.S. Application Data

(63) Continuation of application No. PCT/JP2023/004730, filed on Feb. 13, 2023.

(30) Foreign Application Priority Data

Mar. 9, 2022  (JP) ................. 2022-036133

(51) Int. Cl.
*G02B 5/18*    (2006.01)

(52) U.S. Cl.
CPC ......... *G02B 5/1857* (2013.01); *G02B 5/1833* (2013.01)

(58) Field of Classification Search
CPC ............................ G02B 5/1857; G02B 5/1833
See application file for complete search history.

(56) References Cited

U.S. PATENT DOCUMENTS

| | | | |
|---|---|---|---|
| 2015/0331167 A1 | 11/2015 | Escuti et al. | |
| 2016/0033698 A1 | 2/2016 | Escuti et al. | |
| 2020/0326579 A1 | 10/2020 | Sato et al. | |

FOREIGN PATENT DOCUMENTS

| | | |
|---|---|---|
| JP | 2015-532468 A | 11/2015 |
| JP | 2017-522601 A | 8/2017 |
| JP | 2019-203983 A | 11/2019 |
| WO | 2019/131966 A1 | 7/2019 |

OTHER PUBLICATIONS

English Machine Translation of JP 2019-203983A (Year: 2019).*

* cited by examiner

*Primary Examiner* — Anne M Hines
(74) *Attorney, Agent, or Firm* — Maier & Maier, PLLC

(57) ABSTRACT

According to one embodiment, a liquid crystal optical element includes a substrate, an alignment film, and a liquid crystal layer. The alignment film includes a plurality of first areas and a second area. The liquid crystal layer includes a first alignment area overlapping with the first area and including a plurality of first liquid crystal molecules forming an alignment pattern in which longitudinal axes of the first liquid crystal molecules successively vary and a second alignment area overlapping with the second area and including a plurality of second liquid crystal molecules, longitudinal axes of the plurality of second liquid crystal molecules being arranged in the same direction.

11 Claims, 10 Drawing Sheets

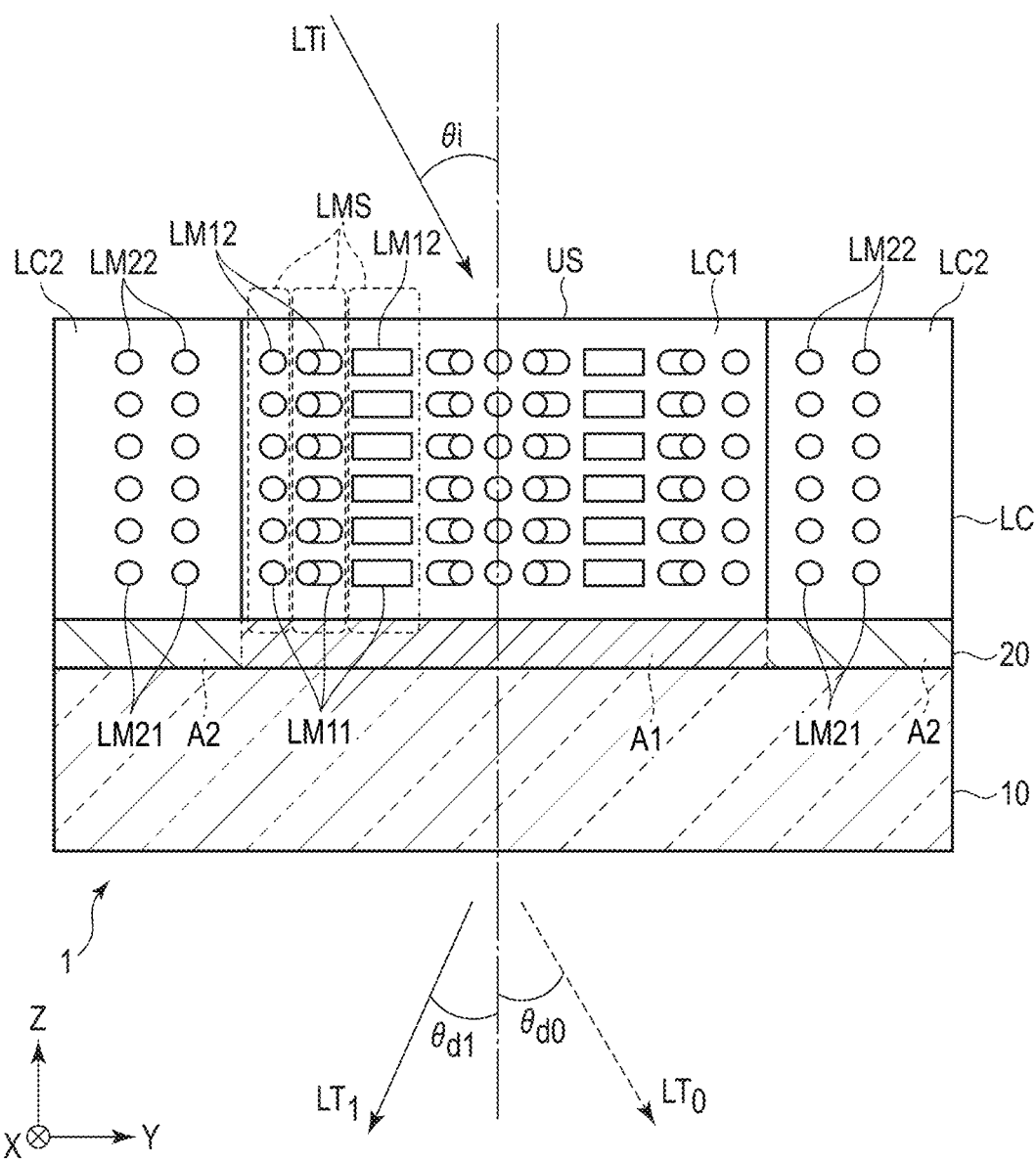
F I G. 5

LIQUID CRYSTAL OPTICAL ELEMENT AND MANUFACTURING METHOD OF THE SAME

CROSS-REFERENCE TO RELATED APPLICATIONS

This application is a Continuation Application of PCT Application No. PCT/JP2023/004730, filed Feb. 13, 2023 and based upon and claiming the benefit of priority from Japanese Patent Application No. 2022-036133, filed Mar. 9, 2022, the entire contents of all of which are incorporated herein by reference.

FIELD

Embodiments described herein relate generally to a liquid crystal optical element and a manufacturing method of the same.

BACKGROUND

For example, a liquid crystal polarization grating using a liquid crystal material is suggested. When light has wavelength of A is made incident, such the liquid crystal polarization grating divides the incident light into zero-order diffracted light and first-order diffracted light. When such liquid crystal polarization grating is realized, liquid crystal molecules need to be complicatedly aligned in a surface. Photo-alignment treatment and rubbing treatment are examples of alignment treatments for aligning the liquid crystal molecules.

BRIEF DESCRIPTION OF THE DRAWINGS

FIG. 5 is a cross-sectional view schematically showing a second configuration example of the liquid crystal optical element 1.

DETAILED DESCRIPTION

Figure 1:
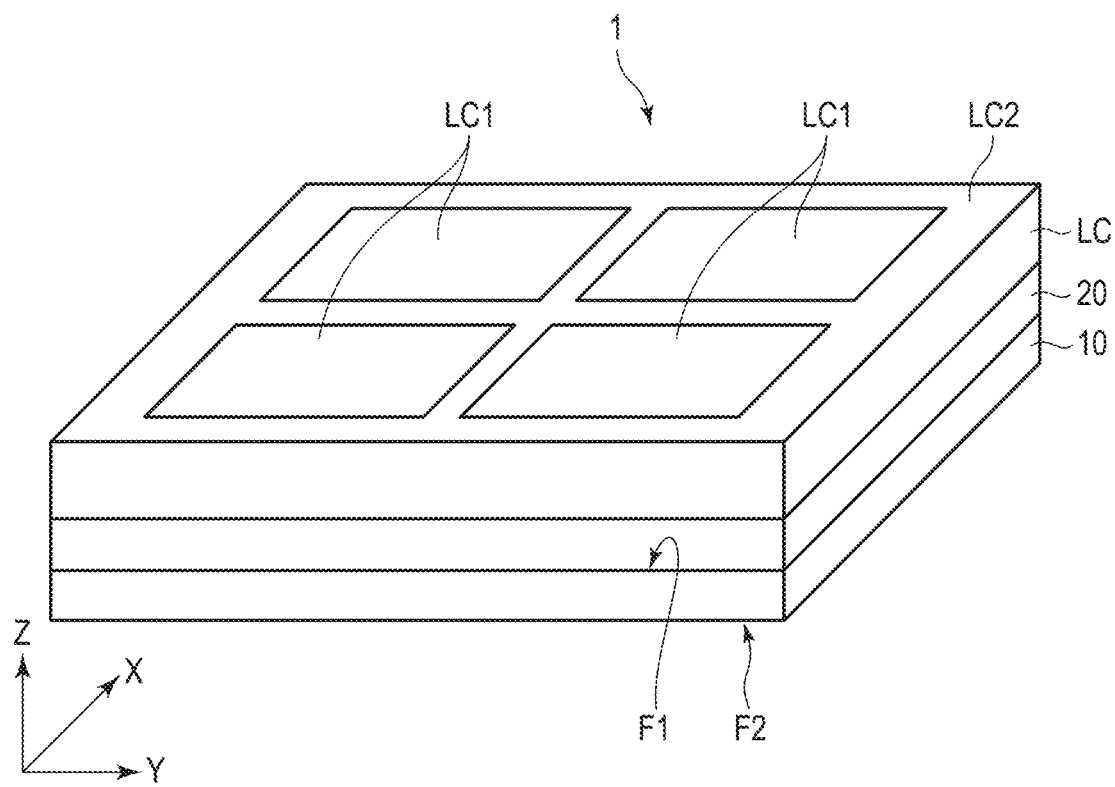
FIG. 1 is a diagram schematically showing a liquid crystal optical element 1 of the present embodiment.

In general, according to one embodiment, a liquid crystal optical element includes a substrate, an alignment film provided on the substrate, and a liquid crystal layer provided on the alignment film. The alignment film includes a plurality of first areas treated with an alignment treatment and a second area surrounding each of the plurality of first areas. The liquid crystal layer includes a first alignment area overlapping with the first area and including a plurality of first liquid crystal molecules forming an alignment pattern in which longitudinal axes of the first liquid crystal molecules successively vary and a second alignment area overlapping with the second area and including a plurality of second liquid crystal molecules, longitudinal axes of the plurality of second liquid crystal molecules being arranged in the same direction. The liquid crystal layer is cured in a state in which alignment directions of the plurality of first liquid crystal molecules and the plurality of second liquid crystal molecules are fixed.

According to one embodiment, a manufacturing method of a liquid crystal optical element forms an alignment film on a substrate, performs a first alignment treatment of conducting an interference exposure for the alignment film by using a beam of a first circularly polarized light and a beam of a second circularly polarized light reverse to the first circularly polarized light, performs a second alignment treatment in which the alignment film is exposed to a beam of a linearly polarized light, and forms a liquid crystal layer on the alignment film.

According to another embodiment, a manufacturing method of a liquid crystal optical element forms an alignment film on a substrate, performs a first alignment treatment of conducting an interference exposure for the alignment film by using a beam of a first circularly polarized light and a beam of a second circularly polarized light reverse to the first circularly polarized light, performs a second alignment treatment of rubbing the alignment film, and forms a liquid crystal layer on the alignment film.

The embodiments will be described hereinafter with reference to the accompanying drawings. The disclosure is a mere example, and arbitrary change of gist which can be easily conceived by a person of ordinary skill in the art naturally falls within the inventive scope. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

In the figures, an X axis, a Y axis and a Z axis orthogonal to each other are described to facilitate understanding as needed. A direction along the X axis is referred to as an X direction or a first direction, a direction along the Y axis is referred to as a Y direction or a second direction, and a direction along the Z axis is referred to as a Z direction or a third direction. A plane defined by the X axis and the Y axis is referred to as an X-Y plane, and a plane defined by the X axis and Z axis is referred to as an X-Z plane. Viewing the X-Y plane is referred to as planar view.

FIG. 1 is a diagram schematically showing a liquid crystal optical element 1 of the present embodiment. The liquid crystal optical element 1 comprises a substrate 10, an alignment film 20, and a liquid crystal layer LC.

The substrate 10 is a transparent substrate that transmits light and is composed of, for example, transparent glass plates or transparent synthetic resin plates. The substrate 10 may composed of, for example, a transparent synthetic resin plate having flexibility. The substrate 10 may have an arbitrary shape. For example, the substrate 10 may be curved. For example, the refractive index of the substrate 10 is greater than that of air.

In this specification, the term "light" includes visible light and invisible light. For example, the wavelength of the lower limit of a visible light range is greater than or equal to 360 nm but less than or equal to 400 nm. The wavelength of the upper limit of a visible light range is greater than or equal to 760 nm but less than or equal to 830 nm. Visible light includes a first component (blue component) of a first wavelength band (for example, 400 to 500 nm), a second component (green component) of a second wavelength band (for example, 500 to 600 nm), and a third component (red component) of a third wavelength band (for example, 600 to 700 nm). Invisible light includes ultraviolet light having a wavelength band in which the wavelength is shorter than the first wavelength band, and infrared light having a wavelength band in which the wavelength is longer than the third wavelength band.

In this specification, the term "transparent" should preferably mean "colorless and transparent". However, the term "transparent" may mean "semitransparent" or "colored and transparent".

The substrate 10 is shaped in a flat plate parallel to the X-Y plane and has a first main surface F1 and a second main surface F2. The first main surface F1 and the second main surface F2 are surfaces substantially parallel to the X-Y plane and face each other in the third direction Z. The second main surface F2 is in contact with, for example, air but may be covered with other thin films.

The alignment film 20 is provided on the substrate 10. In the example shown in FIG. 1, the alignment film 20 is in contact with the first main surface F1.

The liquid crystal layer LC is provided on the alignment film 20. In the example shown in FIG. 1, the liquid crystal layer LC includes a plurality of first alignment areas LC1 and a second alignment area LC2. The plurality of first alignment areas LC1 are provided in a matrix in the X direction and the Y direction. The second alignment area LC2 is provided so as to surround the first alignment areas LC1. At least, each of the first alignment areas LC1 of the liquid crystal layer LC functions as a diffraction unit diffracting incident light. The liquid crystal layer LC is to be described later. Each of the first alignment areas LC1 and the second alignment area LC2 includes liquid crystal molecules aligned in a certain direction. However, the alignment direction of the liquid crystal molecules in the first alignment areas LC1 is different from the alignment direction of the liquid crystal molecules in the second alignment areas LC2.

Figure 2:
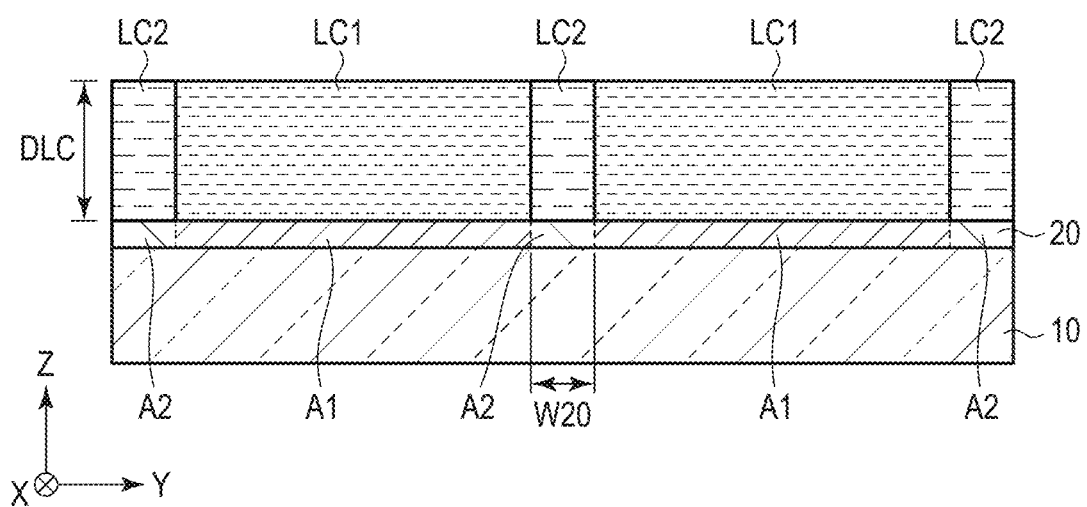
FIG. 2 is a plan view schematically showing an example of an alignment pattern in a liquid crystal layer LC1 and a liquid crystal layer LC2.

FIG. 2 is a cross-sectional view showing a cross-section along the Y direction of the liquid crystal optical element 1 shown in FIG. 1.

The alignment film 20 is provided on the substrate 10. The alignment film 20 includes a plurality of first areas A1 treated with alignment treatment and a second area A2 surrounding these first areas A1. A width W20 of the second area A2 along the Y direction is, for example, around several micrometers to several centimeters. The width of the second area A2 along the X direction is also equal to the width W20.

As described later, alignment treatments to form the first area A1 and the second area A2 provide alignment restriction force to the alignment film 20, the alignment restriction force specifying an alignment direction of the liquid crystal molecules included in the liquid crystal layer LC. The alignment treatments are, for example, light alignment treatment by means of light irradiation and an alignment treatment by means of rubbing. The alignment film 20 is formed of, for example, polyimide.

In the liquid crystal layer LC, the first alignment area LC1 is formed on the first area A1 and the second alignment area LC2 is formed on the second area A2. The first alignment area LC1 and the second alignment area LC2 have thicknesses DLC substantially equivalent to each other. As an example, the thickness DLC is 1000 nm to 10 μm and is preferably 2000 nm to 6000 nm. The thickness DLC described herein corresponds to a thickness in the Z direction in a case where the liquid crystal layer LC is a single-layer body. The liquid crystal layer LC may be a multilayer body in which a plurality of layers are stacked.

Refractive indexes of the substrate 10, the alignment film 20, and the liquid crystal layer LC are preferably equivalent to each other for suppressing undesirable refraction and reflection at the interface between the alignment film 20 and the liquid crystal layer LC and the interface between the substrate 10 and the alignment film 20. Here, "equivalent" indicates a case where the difference in refractive index is 0.1 or less.

Figure 3:
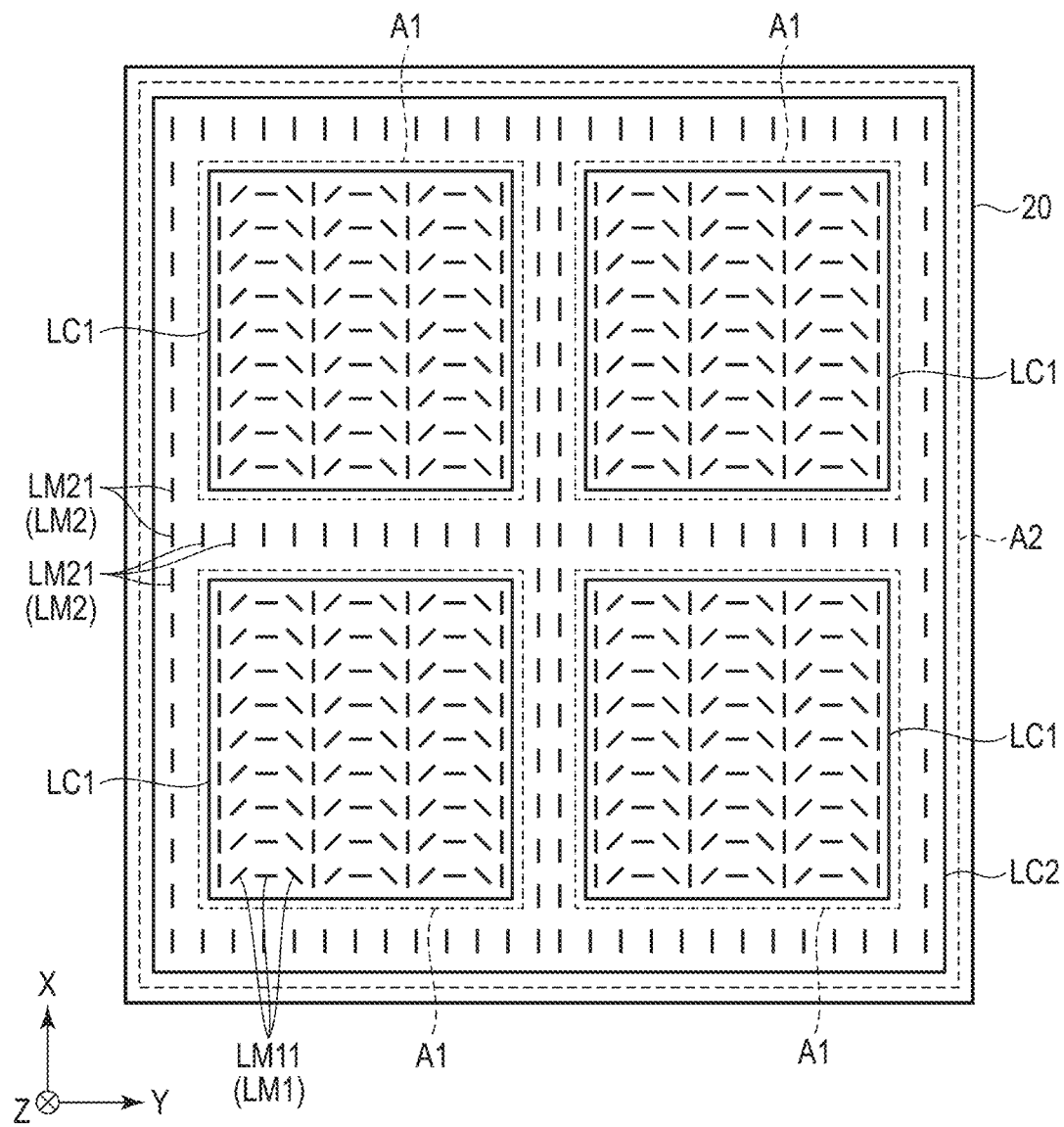
FIG. 3 is a cross-sectional view schematically showing the liquid crystal optical element 1.

FIG. 3 is a plan view schematically showing an example of an alignment pattern in the liquid crystal layer LC. In the alignment film 20, the plurality of first areas A1, which are indicated by the dotted line, are formed in a matrix in the X direction and the Y direction. The first alignment area LC1 overlapping with the first area A1 includes a plurality of first liquid crystal molecules LM1. The second alignment area LC2 overlapping with the second area A2 includes a plurality of second liquid crystal molecules LM2.

Among the plurality of first liquid crystal molecules LM1, FIG. 3 shows alignment directions of the longitudinal axes of the first liquid crystal molecules LM11 located in the vicinity of the alignment film 20. Further, among the plurality of second liquid crystal molecules LM2, FIG. 3 shows an alignment direction of the longitudinal axes of second liquid crystal molecules LM21 located in the vicinity of the alignment film 20.

The alignment directions of the liquid crystal molecules LM11 arranged along the Y direction are different from one another in the first alignment area LC1.

For example, the plurality of first liquid crystal molecules LM11 arranged in the Y direction form an alignment pattern in which each longitudinal directions of the plurality first liquid crystal molecules LM11 vary successively. In other words, the alignment directions of the first liquid crystal molecules LM11 arranged in the Y direction vary by a certain angle from the left side to the right side of the figure. More specifically, the alignment directions of the first liquid crystal molecules LM11 arranged in the Y direction vary clockwise from the left side to the right side of the figure. Here, the variations in the alignment directions of the first liquid crystal molecules LM11 are constant along the Y direction but may gradually increase or gradually decrease.

The alignment directions of the liquid crystal molecules LM11 arranged along the X direction substantially coincide with one another.

That is, spatial phases in the X-Y plane of the first alignment area LC1 are substantially the same along the X direction and are different along the Y direction.

The alignment directions of the plurality of second liquid crystal molecules LM21 are substantially the same in the second alignment area LC2. That is, the plurality of second liquid crystal molecules LM21 arranged in the X direction and the plurality of second liquid crystal molecules LM21 arranged in the Y direction are arranged such that longitudinal axes of these molecules face the same direction. The alignment direction of the second liquid crystal molecules LM21 may be any direction in the X-Y plane. In the shown example, the alignment direction of each of the second liquid crystal molecules LM21 is parallel to the X direction. The alignment direction of the second liquid crystal molecules LM21 may be parallel to the Y direction.

Spatial phases of the second alignment area LC2 in the X-Y plane are substantially the same along the X direction and are different along the Y direction.

Next, a specific configuration example of the liquid crystal optical element 1 of the present embodiment will be described.

First Configuration Example

Figure 4:
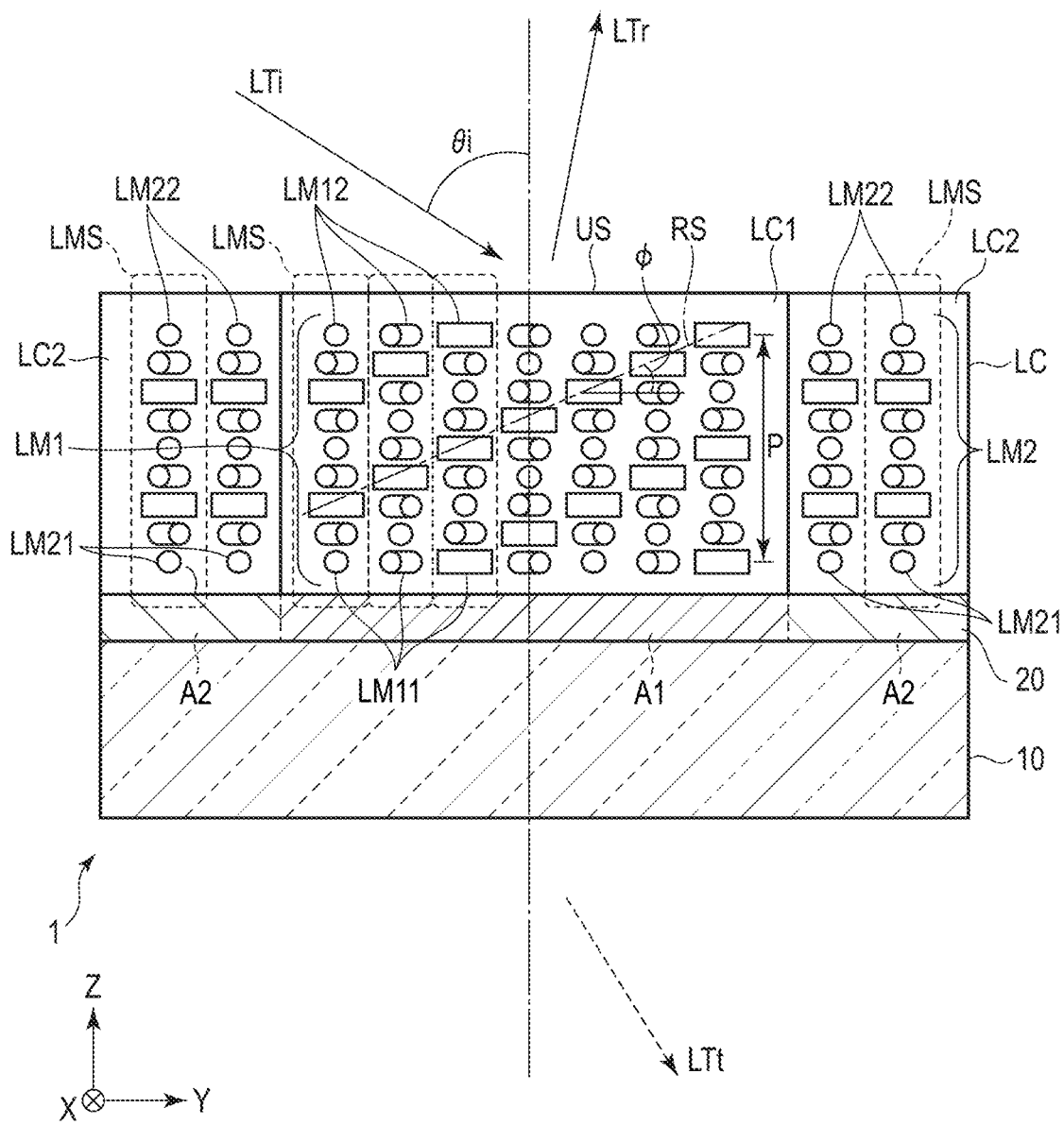
FIG. 4 is a cross-sectional view schematically showing a first configuration example of the liquid crystal optical element 1.

FIG. 4 is a cross-sectional view schematically showing a first configuration example of the liquid crystal optical element 1. FIG. 4 corresponds to a cross-sectional view including the first alignment area LC1 of the liquid crystal optical element 1 shown in FIG. 1. The first configuration example corresponds to an example in which the liquid crystal layer LC functions as a reflective type diffraction grating.

The liquid crystal layer LC includes a plurality of liquid crystal structures LMS. The liquid crystal structure LMS located in the first alignment area LC1 contain the first liquid crystal molecule LM11 located on one end side of the area and a first liquid crystal molecule LM12 located on the other end side. The liquid crystal structure LMS located in the second alignment area LC2 contain the second liquid crystal molecule LM21 located on one end side of the area and a second liquid crystal molecule LM22 located on the other end side. The first liquid crystal molecules LM11 and the second liquid crystal molecules LM21 are close to the alignment film 20, and the first liquid crystal molecules LM12 and the second liquid crystal molecules LM22 are close to an upper surface US of the liquid crystal layer LC.

The alignment directions of the first liquid crystal molecule LM11 and the second liquid crystal molecule LM21 are specified by an alignment restriction force of the alignment film 20.

Each of the liquid crystal structures LMS located in the first alignment area LC1 can be regarded as a continuum in which the first liquid crystal molecules LM1 including the first liquid crystal molecules LM11 and LM12 are arranged in the Z direction. Therefore, the alignment direction of the first liquid crystal molecule LM11 is specified, and thus the alignment directions of the plurality of first liquid crystal molecules LM1 including the first liquid crystal molecule LM12 and arranged in the Z direction are specified in accordance with the alignment direction of the first liquid crystal molecule LM11. Thus, the plurality of first liquid crystal molecules LM1 including the first liquid crystal molecules LM11 and LM12 in each of the liquid crystal structures LMS are aligned in a certain direction in the X-Y plane.

Each of the liquid crystal structures LMS located in the second alignment area LC2 can be regarded as a continuum in which the second liquid crystal molecules LM2 including the second liquid crystal molecules LM21 and LM22 are arranged in the Z direction. Therefore, the alignment direction of the second liquid crystal molecule LM21 is specified, and thus the alignment directions of the plurality of second liquid crystal molecules LM2 including the second liquid crystal molecules LM22 and arranged in the Z direction are specified in accordance with the alignment direction of the second liquid crystal molecule LM21. Thus, the plurality of second liquid crystal molecules LM2 in each of the liquid crystal structures LMS are aligned in a certain direction in the X-Y plane.

The liquid crystal layer LC of the present embodiment is cured in a state in which the alignment directions of the plurality of first liquid crystal molecules LM1 and the second liquid crystal molecules LM2 are fixed. That is, the alignment directions of the first liquid crystal molecules LM1 and the second liquid crystal molecules LM2 are not controlled in accordance with electric field. For this reason, the liquid crystal optical element 1 does not comprise an electrode for alignment control. This liquid crystal layer LC is formed by, for example, providing monomer with energy such as light to cause polymerization.

In the configuration example 1 shown in FIG. 4, the liquid crystal layer LC includes cholesteric liquid crystals as the liquid crystal structures LMS. In FIG. 4, to simplify the figure, one liquid crystal molecule LM is shown as a representative example of liquid crystal molecules facing the average alignment direction, among the plurality of liquid crystal molecules located in the X-Y plane. In the first alignment area LC1, the alignment directions of the plurality of first liquid crystal molecules LM11 arranged along the alignment film 20 successively vary along the Y direction. In the second alignment area LC2, the alignment directions of the plurality of second liquid crystal molecules LM21 arranged along the alignment film 20 are the same.

When one liquid crystal structure LMS located in the first alignment area LC1 is focused on, the plurality of first liquid crystal molecules LM1 are turned and stacked in a helical shape along the Z direction. The alignment directions of the liquid crystal molecules LM11 are substantially coincident with the alignment directions of the first liquid crystal molecules LM12. The liquid crystal structure LMS has a helical pitch P. The helical pitch P indicates one period (360 degrees) of a spiral.

The liquid crystal layer LC includes a plurality of reflective surfaces RS as ones indicated by one-dot chain line. In one example, a plurality of reflective surfaces RS are substantially parallel to each other. The reflective surface RS is inclined with respect to the X-Y plane at an inclination angle φ and has a substantially plane shape extending in a certain direction. The reflective surface RS selectively reflects light LTr, which is a part of incident light LTi, and transmits light LTt, which is light other than the light LTr, in accordance with the Bragg's law. The reflective surface RS reflects the light LTr in accordance with the inclination angle φ.

Here, the reflection surface RS corresponds to a surface in which the alignment directions of the liquid crystal molecules LM are aligned, or a surface (an equiphase wave surface) in which the spatial phases are aligned. The shape of the reflection surface RS is not limited to a plane shape and may be a curved shape such as a concave shape or a convex shape, and thus, is not particularly limited.

The cholesteric liquid crystals, which are the liquid crystal structures LMS, reflect circularly polarized light that has the same turning direction as the cholesteric liquid crystals, among light that has a predetermined wavelength λ included in a selective reflection band range Δλ. For example, when the turning direction of the cholesteric liquid crystal is right-handed, the cholesteric liquid crystal reflects right-handed circularly polarized light and transmits left-handed circularly polarized light, among light having the predetermined wavelength λ. Similarly, when the turning direction of the cholesteric liquid crystal is left-handed, the cholesteric liquid crystal reflects left-handed circularly polarized light and transmits right-handed circularly polarized light, among light having the predetermined wavelength λ.

When the helical pitch of the cholesteric liquid crystal is referred to as P, the refractive index of the liquid crystal molecules to extraordinary light is referred to as ne, and the refractive index of the liquid crystal molecules to ordinary light is referred to as no, a selective reflection region Δλ of the cholesteric liquid crystal to the perpendicularly incident light is generally referred to as "no*P to ne*P". Specifically, the selective reflection range Δλ of cholesteric crystals changes according to the inclination angle φ of the reflective surfaces RS, an incident angle θi, and the like, with respect to the range "no*P to ne*P".

The liquid crystal layer LC may be either a single-layer body or a multilayer body. When the liquid crystal layer LC is a multilayer body, liquid crystal layers having different helical pitches may be stacked, or liquid crystal layers having spiral turning directions opposite to each other may be stacked. When the liquid crystal layer LC is a single-layer body, helical pitch in the liquid crystal layer may successively vary.

Second Configuration Example

FIG. 5 is a cross-sectional view schematically showing a second configuration example of the liquid crystal optical element 1. FIG. 5 corresponds to a cross-sectional view including the first alignment area LC1 of the liquid crystal optical element 1 shown in FIG. 1. The second configuration example corresponds to an example in which the liquid crystal layer LC functions as a transmissive type diffraction grating.

The liquid crystal layer LC has the nematic liquid crystal which has a uniform alignment direction. In the first alignment area LC1, the alignment directions of the plurality of first liquid crystal molecules LM11 arranged along the alignment film 20 successively vary along the Y direction. In the second alignment area LC2, the alignment directions of the plurality of second liquid crystal molecules LM21 arranged along the alignment film 20 are the same.

When the liquid crystal layer LC is the above-described multilayer body, a nematic liquid crystal a part of which is twistedly aligned may be adopted in the liquid crystal layer LC.

When the refractive index anisotropy or birefringence of the liquid crystal layer LC is referred to as Δn (difference between a refractive index ne to extraordinary light and a refractive index no to ordinary light, of liquid crystal molecules), a thickness of the liquid crystal layer LC is referred to as DLC, and wavelength of diffracted light is referred to as λ, it is preferable that a retardation Δn·DLC of the liquid crystal layer LC is λ/2.

When one liquid crystal structure LMS located in the first alignment area LC1 is focused on, the alignment direction of the first liquid crystal molecule LM11 substantially coincides with the alignment direction of the first liquid crystal molecule LM12. In addition, the alignment directions of the liquid crystal molecules LM1 including the first liquid crystal molecules LM11 and the first liquid crystal molecules LM12 substantially are aligned.

Light may enter the liquid crystal optical element 1 from the liquid crystal layer LC side or from the substrate 10 side. A case where light enters from the liquid crystal layer LC side will be described below. After passing through the liquid crystal optical element 1, the incident light LTi is divided into zero-order diffracted light LT0 and first-order diffracted light LT1. A diffraction angle θd0 of the zero-order diffracted light LT0 is equivalent to an incident angle θi of the incident light LTi. Diffraction angle θd1 of the first-order diffracted light LT1 is different from the incident angle θi.

Next, an example of manufacturing method of the liquid crystal optical element 1 will be described.

Figure 6:
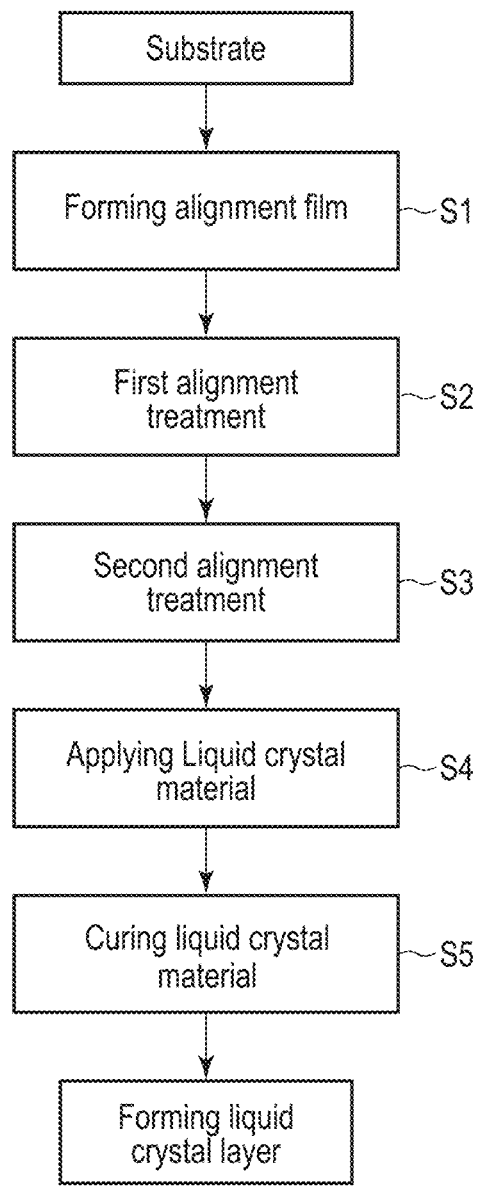
FIG. 6 is a manufacturing flowchart describing an example of manufacturing method of the liquid crystal optical element 1.

FIG. 6 is a manufacturing flowchart describing an example of the manufacturing method of the liquid crystal optical element 1 shown in FIG. 1.

Fist, in step 1 (S1) in FIG. 6, the alignment film 20 is formed on the first main surface F1 of the substrate 10, which has been washed. The alignment film 20 is formed of, for example, polyimide.

Next, a first alignment treatment for forming the first area A1 on the alignment film 20 is performed in step 2 (S2) in FIG. 6. The first alignment treatment, which will be described in detail later, is a treatment by means of two-beam interference exposure light using light beam of first circularly polarized light and light beam of second circularly polarized light, which is reverse to the light beam of the first circularly polarized light. As an example, wavelengths of the light beams of the first circularly polarized light and the second circularly polarized light are ultraviolet rays. Depending on a type of the alignment film, the first alignment treatment may be performed using the light beam of the first wavelength band, instead of ultraviolet rays.

In the case where the liquid crystal optical element 1 that has an area greater than an area that can be exposed in one first alignment treatment, the alignment film 20 is divided into a plurality of areas. Then, the first alignment treatment is sequentially performed for each of the areas. The areas treated with the first alignment treatment with one exposure correspond to the first areas A1 in FIG. 2. The alignment treatment directions of the first areas A1 are set to form the alignment pattern of the first liquid crystal molecules LM11 shown in FIG. 3.

Next, a second alignment treatment for forming the second area A2 on the alignment film 20 is performed in step 3 (S3) in FIG. 6. The second alignment treatment, which will be described in detail later, is a photo-alignment treatment performing exposure with beam of linearly polarized light or is an alignment treatment by means of rubbing in one direction. The second alignment treatment is performed for the entire alignment film 20. In this treatment, the areas treated with the first alignment treatment may be covered with a mask. The areas to which the first alignment treatment has not been performed and the second alignment treatment has been performed correspond to the second areas A2 in FIG. 2. The alignment treatment directions of the second areas A2 are set to form the uniform alignment pattern of the first liquid crystal molecules LM21 shown in FIG. 3.

The order of the step 2 (S2) and the step 3 (S3) may be reverse.

When polyimide is used for the alignment film 20, imidization of the polyimide may occur before the first alignment treatment or after the second alignment treatment.

Next, a liquid crystal material including liquid crystal monomer is applied on the alignment film 20 to be formed into a film in step 4 (S4) in FIG. 6. The liquid crystal material is, for example, prepared by dissolving liquid crystal monomer for forming the cholesteric liquid crystal in solvent. The liquid crystal material is in contact with the alignment film 20. Thus, solvent has a property to solve the liquid crystal monomer and not solve the alignment film 20. The liquid crystal material is applied to the entire surface of the alignment film 20 so as to cover the first area A1 and the second area A2 treated with the alignment treatment. After this application, the substrate 10 to which the liquid crystal material has been applied is provided in a chamber and the inside of the chamber is decompressed. Thus, solvent included in the liquid crystal material is dried.

Subsequently, the liquid crystal material is baked. Thus, among the liquid crystal molecules included in the liquid crystal material, the first liquid crystal molecules LM1 overlapping with the first area A1 and the second liquid crystal molecules LM2 overlapping with the second areas A2 are arranged in a certain direction according to the alignment treatment direction of the alignment film 20.

In this state, the liquid crystal material is uncured and formed in a film shape.

Next, ultraviolet rays are applied to the liquid crystal material to cure the liquid crystal material in step 5 (S5) in FIG. 6. Ultraviolet rays are applied to the uncured liquid crystal monomer overlapping with the alignment film 20. Thus, the liquid crystal monomer is polymerized to cure the liquid crystal material. Then the liquid crystal layer LC is obtained.

In this embodiment, the liquid crystal layer LC includes the plurality of alignment areas LC1 overlapping with the plurality of first areas A1, respectively. Each of the plurality of first alignment areas LC1 includes the first liquid crystal molecules LM1 forming a certain alignment pattern and functions as a diffraction grating. The increase in the area of the liquid crystal optical element 1 can be achieved by forming the plurality of first alignment areas LC1 functioning as the diffraction gratings on the same substrate in this manner.

In addition, the liquid crystal layer LC includes the second alignment area LC2 overlapping with the second area A2 between adjacent first alignment areas LC1. The second alignment area LC2 includes the second liquid crystal molecules LM2. Longitudinal axes of these second liquid crystal molecules LM2 are aligned to face the same direction. Therefore, undesirable scattering and cloudiness in the second alignment area LC2 are suppressed. Thus, decrease in light utilization efficiency in the liquid crystal optical element 1 can be suppressed.

Reasons to form the second alignment areas LC2 will be described below.

For achieving the increase in the area of the liquid crystal optical element 1, the alignment film 20 needs to be divided into a plurality of areas, and the first alignment treatment needs to be performed for each of these areas to form the first areas A1. At this time, an area (gap) to which the first alignment treatment has not been performed and which has the width of several micrometers to several centimeters may be formed between the areas treated with the first alignment treatment. Therefore, the second alignment treatment is performed for the entire alignment film 20. Therefore, even when an area not treated with the first alignment treatment exists, the second alignment treatment forms this area as the second area A2, which has an alignment restriction force in the same direction. Therefore, among the liquid crystal layers LC, the second liquid crystal molecules LM2 overlapping with the second area A2 are arranged such that the longitudinal axes of these molecules face the same direction to form the second alignment area LC2. Thus, disorder in alignment of the liquid crystal molecules in the gap formed at the time of the first alignment treatment can be suppressed.

Next, the first alignment treatment by means of two-beam interference exposure using circularly polarized light will be described.

Figure 7:
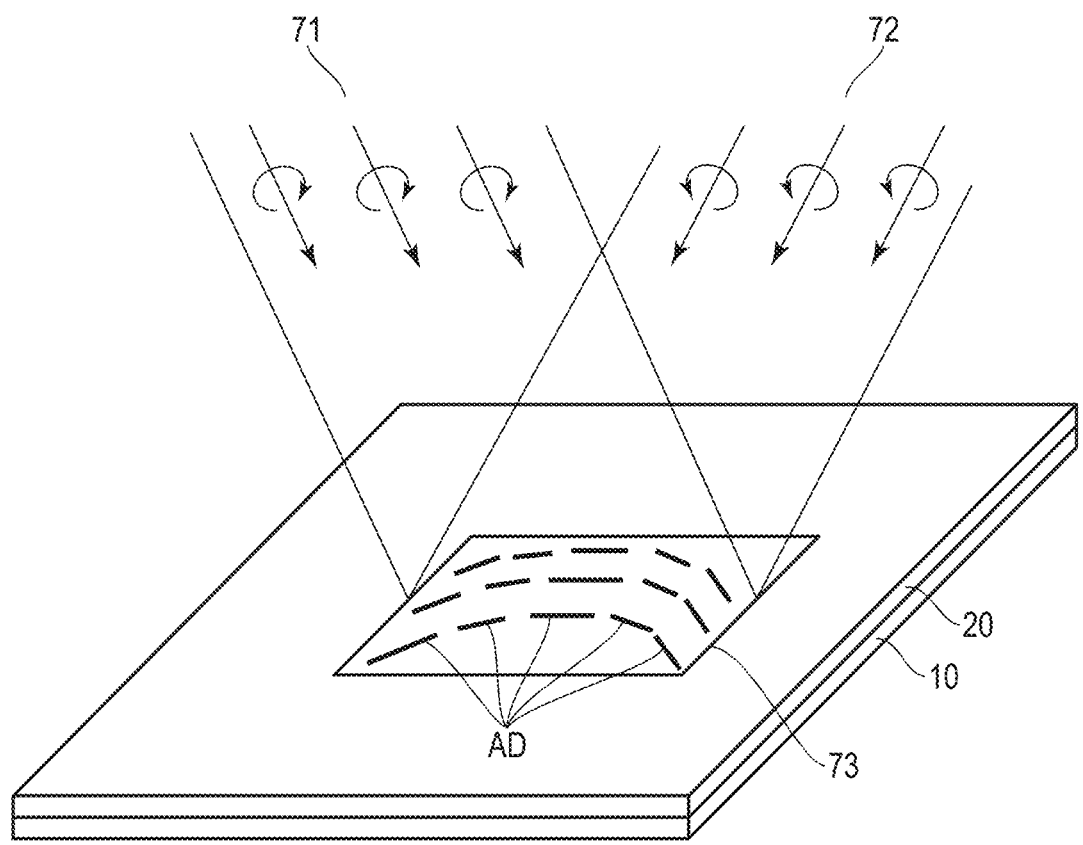
FIG. 7 is a diagram showing an alignment treatment by means of two-beam interference exposure using circularly polarized light.

FIG. 7 is a diagram showing the first alignment treatment by means of two-beam interference exposure using circularly polarized light.

Beam from the laser light source is enlarged to the parallel luminous flux. After this luminous flux being divided into two luminous fluxes and each of the two luminous fluxes passing through the wave plate, the two luminous fluxes are converted to a right-handed first circularly polarized light 71 and a left-handed circularly polarized light 72, respectively. These first circularly polarized light 71 and second circularly polarized light 72 interfere with each other on the surface of the alignment film 20. A polarization pattern specially varying is recorded as an alignment treatment direction AD in an area 73 on the alignment film 20 in which the first circularly polarized light 71 and the second circularly polarized light 72 interfere with each other. Alignment restriction force along the alignment treatment direction AD is provided to the area 73. The first liquid crystal molecules LM1 of the liquid crystal layer LC are aligned along the alignment treatment direction AD.

Some examples of the first alignment treatment described in the step (S2) in FIG. 6 and the second alignment treatment described in the step (S3), of the manufacturing method of the liquid crystal optical element 1, will be described below.

Example 1

Figure 8:
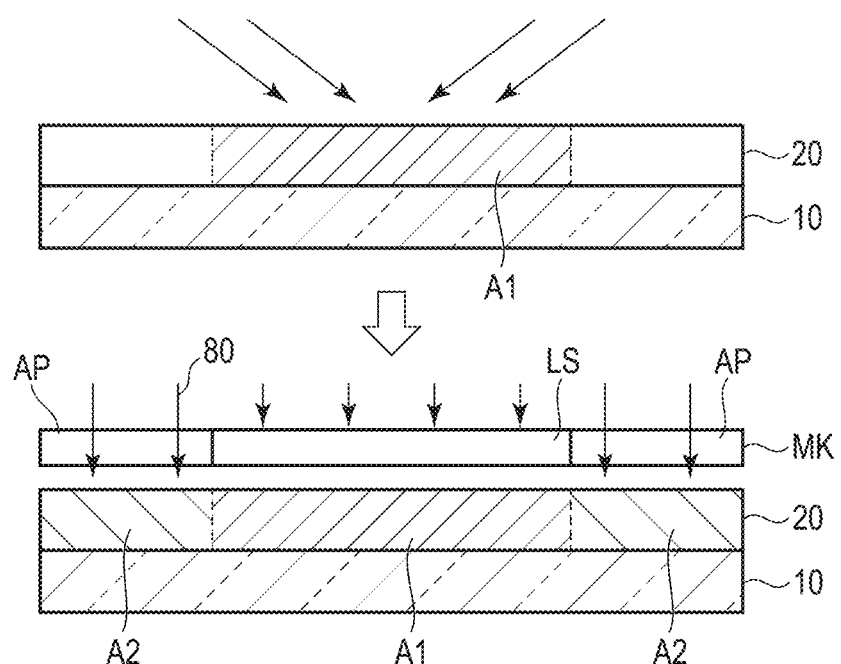
FIG. 8 is a cross-sectional view describing a first alignment treatment and a second alignment treatment in an example 1 of the manufacturing method of the liquid crystal optical element 1.

FIG. 8 is a cross-sectional view describing the first alignment treatment and the second alignment treatment in the example 1 of the manufacturing method of the liquid crystal optical element 1.

In the example 1, the first alignment treatment is performed prior to the second alignment treatment. As shown in the upper side of FIG. 8, the first alignment treatment by means of exposure to interfering light is performed with dividing the alignment film 20 into a plurality of areas. FIG. 8 shows a state in which the first alignment treatment is performed for one area. One area of the alignment film 20 is formed as the first area A1 by performing the first alignment treatment.

Then, the second alignment treatment shown in the lower side of FIG. 8 is performed. The second alignment treatment in the example 1 is the alignment treatment performed for the entire alignment film 20 by means of exposure to linearly polarized ultraviolet rays. In the example 1, in the second alignment treatment, a mask MK including a shield portion LS corresponding to the first area A1 and an aperture portion AP corresponding to the second area A2 is prepared. Then, the mask MK is positioned such that the shield portion LS overlaps with the first area A1. The mask MK may be in contact with the alignment film 20 or may be spaced apart from the alignment film 20. Then, ultraviolet rays 80, which are linearly polarized light, are applied via the mask MK. A part of the ultraviolet rays 80 is shield by the shield portion LS. Thus, the first area A1 is not exposed to the ultraviolet rays 80. The ultraviolet rays 80 passing through the aperture AP are applied to the surface of the alignment film 20. The area treated with the second alignment treatment is formed as the second area A2. That is, in the example 1, the first area A1 is formed by the exposure in the first alignment treatment alone, and the second area A2 is formed by the exposure in the second alignment treatment alone.

Thus, the alignment film 20 including the first area A1 and the second area A2 can be obtained.

A ND filter may be used instead of the mask MK.

Example 2

Figure 9:
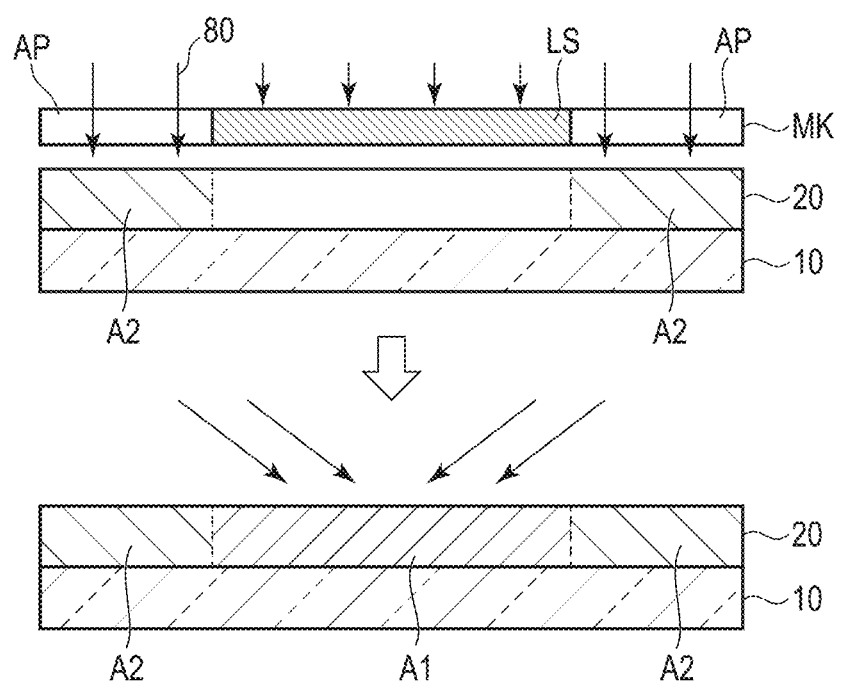
FIG. 9 is a cross-sectional view describing the first alignment treatment and the second alignment treatment in an example 2 of the manufacturing method of the liquid crystal optical element 1.

FIG. 9 is a cross-sectional view describing the first alignment treatment and the second alignment treatment in the example 2 of the manufacturing method of the liquid crystal optical element 1.

Other than the point that the second alignment treatment is performed prior to the first alignment treatment, the example 2 is the same as the example 1.

First, as shown in the upper side of FIG. 9, the mask MK including the shield portion LS corresponding to an area in which the first area A1 is to be formed and an aperture portion AP corresponding to an area in which the second area A2 is to be formed is prepared. The mask MK is provided so as to overlap with the alignment film 20. The mask MK may be in contact with the alignment film 20 or may be spaced apart from the alignment film 20. Then, ultraviolet rays 80, which are linearly polarized light, are applied via the mask MK. A part of the ultraviolet rays 80 is shielded by the shield portion LS. Therefore, the ultraviolet rays 80 are not applied to an area overlapping with the shield portion LS, of the alignment film 20. The ultraviolet rays 80 passing through the aperture portion AP are applied to the surface of the alignment film 20. The area treated with the second alignment treatment is formed as the second area A2.

Next, as shown in the lower side of FIG. 9, the mask is detached and the first alignment treatment is performed for the alignment film 20 treated with the second alignment treatment. The area to which the first alignment treatment is performed is an area that overlaps with the shield portion LS and is not aligned in the second alignment treatment. The area that is not aligned in the second alignment treatment and the area to which the first alignment treatment is performed are overlap each other, and the first alignment treatment is performed. This area is formed as the first area A1 by performing the first alignment treatment by means of interference exposure.

Thus, the alignment film 20 including the first area A1 and the second area A2 can be obtained.

Similarly to the example 1, a ND filter may be used instead of the mask in the example 2 as well.

Example 3

Figure 10:
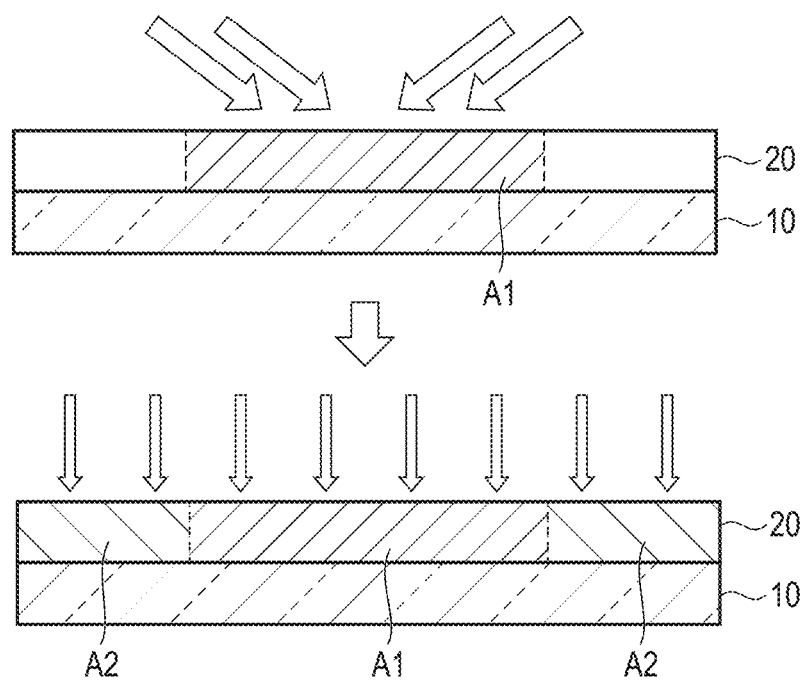
FIG. 10 is a cross-sectional view describing the first alignment treatment and the second alignment treatment in an example 3 of the manufacturing method of the liquid crystal optical element 1.

FIG. 10 is a cross-sectional view describing the first alignment treatment and the second alignment treatment in the example 3 of the manufacturing method of the liquid crystal optical element 1.

The example 3 is different from the example 1 and the example 2 in performing the second alignment treatment without a mask. The first alignment treatment is the same as the one in the example 1.

First, as shown in the upper side of FIG. 10, the first alignment treatment by means of the interference exposure is performed for a plurality of areas in the alignment film 20. This process forms the first area A1.

Then, as shown in the lower side of FIG. 10, the second alignment treatment is performed. Similarly to the example 1, the second alignment treatment in the example 3 is performed for the entire alignment film 20 by means of exposure to linearly polarized ultraviolet rays. The second alignment treatment is performed by exposure amount smaller than that in the first alignment treatment. As an example, the exposure amount in the first alignment treatment is more than or equal to 900 $mJ/cm^2$, and the exposure amount in the second alignment treatment is about 300 $mJ/cm^2$.

According to the analysis of the inventor, it has been confirmed that the alignment restriction force occurs on the alignment film when the exposure amount of ultraviolet rays to the alignment film is more than or equal to 300 $mJ/cm^2$. In addition, when the exposure amount in the second alignment treatment is equal to or less than one-third of the exposure amount in the first alignment treatment, the alignment treatment direction of the first area A1 does not vary even when the first area A1 formed in the first alignment treatment is exposed to the linearly polarized ultraviolet rays during the second alignment treatment.

Thus, the alignment film 20 including the first area A1 and the second area A2 can be obtained.

Example 4

Figure 11:
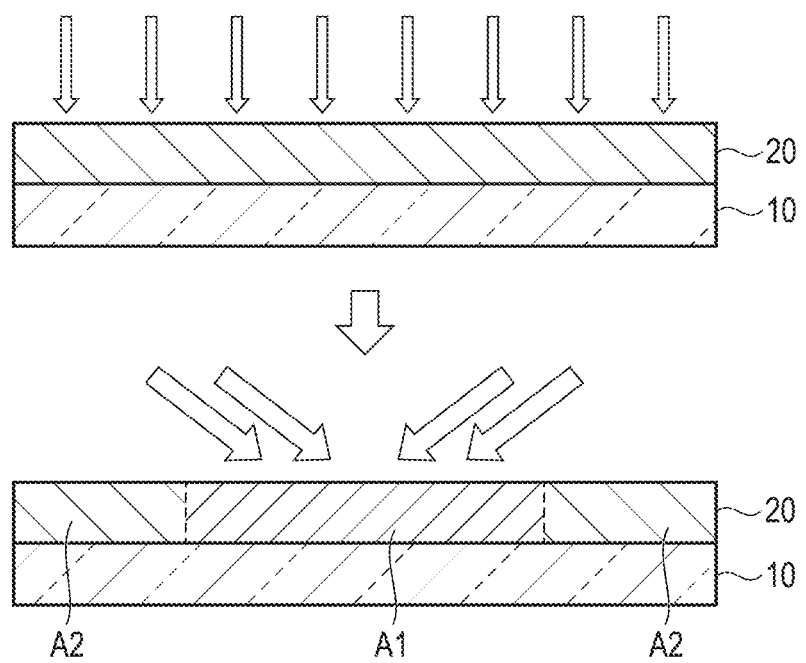
FIG. 11 is a cross-sectional view describing the first alignment treatment and the second alignment treatment in an example 4 of the manufacturing method of the liquid crystal optical element 1.

FIG. 11 is a cross-sectional view describing the first alignment treatment and the second alignment treatment in the example 4 of the manufacturing method of the liquid crystal optical element 1.

Other than the point that the second alignment treatment is performed prior to the first alignment treatment, the example 4 is the same as the example 3.

First, the second alignment treatment is performed as shown in the upper side of FIG. 11. Then, the first alignment treatment is performed as shown in the lower side of FIG. 11. Similarly to the example 3, the second alignment treatment in the example 4 is performed by exposure amount smaller than the exposure amount in the first alignment treatment.

Thus, the alignment film 20 including the first area A1 and the second area A2 can be obtained.

Example 5

Figure 12:
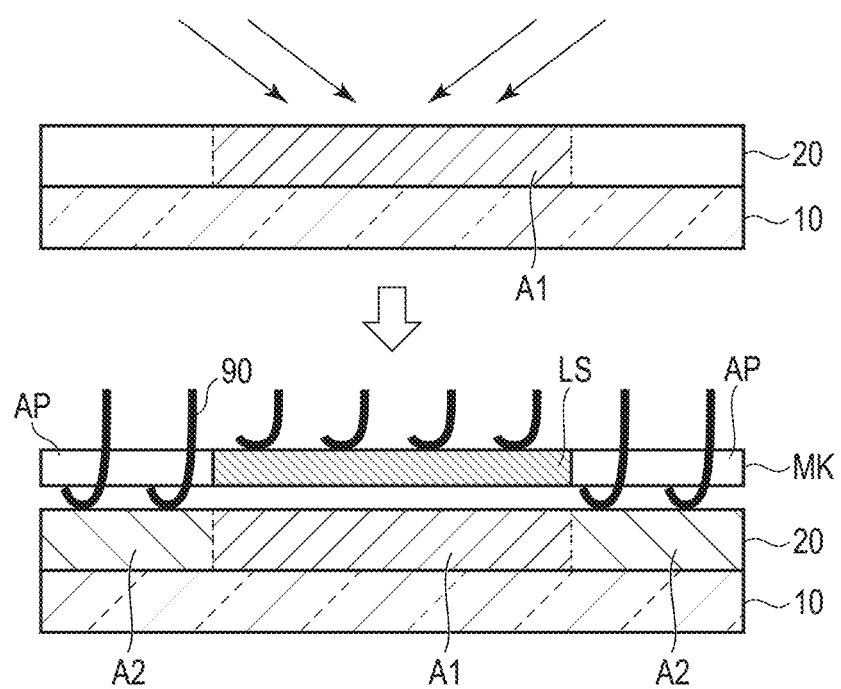
FIG. 12 is a cross-sectional view describing the first alignment treatment and the second alignment treatment in an example 5 of the manufacturing method of the liquid crystal optical element 1.

FIG. 12 is a cross-sectional view describing the first alignment treatment and the second alignment treatment in the example 5 of the manufacturing method of the liquid crystal optical element 1.

The example 5 is different from the example 1 to the example 4 in the point that an alignment treatment that rubs in one direction is performed as the second alignment treatment, instead of the photo-alignment treatment. The first alignment treatment is the same as the one in the example 1.

In the example 5, the first alignment treatment is performed prior to the second alignment treatment. As shown in the upper side of FIG. 12, the first alignment treatment by interference exposure is performed with dividing the alignment film 20 into a plurality of areas and is to be performed several times. This process forms the first area A1.

Next, as shown in the lower side of FIG. 12, the second alignment treatment is performed for the alignment film 20 treated with the first alignment treatment. The second alignment treatment is performed by means of rubbing.

The alignment treatment by means of rubbing is a process that makes the rubbing cloth winding a roller rub with the alignment film to form fine trench structures on the surface of the alignment film. The rubbing treatment can change rubbing strength by changing the process speed (rotation speed or moving speed of the roller) and the push-in quantity of the roller to the alignment film.

In the example 5, the second alignment treatment is performed for the entire alignment film 20. In the example 5, in the second alignment treatment, the mask MK including the shield portion LS corresponding to the first area A1 and the aperture portion AP corresponding to the second area A2 is prepared. Then, the mask MK is positioned such that the shield portion LS overlaps with the first area A1. The mask MK may be in contact with the alignment film 20 or may be spaced apart from the alignment film 20. Then, rubbing treatment is performed via the mask MK. A pile 90 of the rubbing cloth is in contact with the alignment film 20 via the aperture portion AP. Fine trench structures are formed on the alignment film 20 by the pile 90 rubbing the surface of the alignment film 20. The second areas A2 is formed by above process. The shield portion LS of the mask MK overlaps with the first area A1. Therefore, the pile 90 of the rubbing cloth is not in contact with the first area A1. That is, in the example 5, the first area A1 is formed by the exposure in the first alignment treatment alone, and the second area A2 is formed by the rubbing treatment in the second alignment treatment alone.

Thus, the alignment film 20 including the first area A1 and the second area A2 can be obtained.

Example 6

Figure 13:
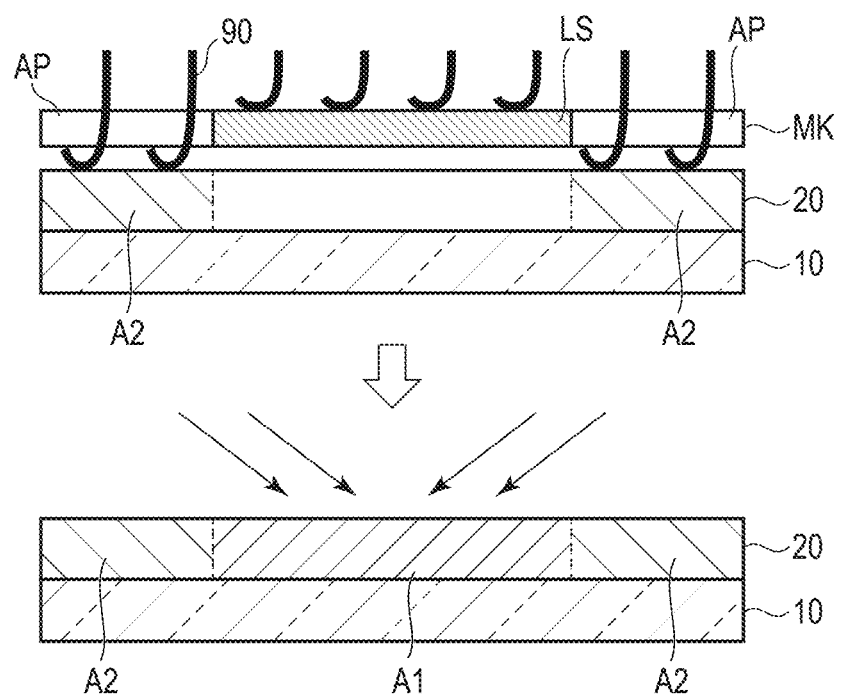
FIG. 13 is a cross-sectional view describing the first alignment treatment and the second alignment treatment in an example 6 of the manufacturing method of the liquid crystal optical element 1.

FIG. 13 is a cross-sectional view describing the first alignment treatment and the second alignment treatment in the example 6 of the manufacturing method of the liquid crystal optical element 1.

Other than the point that the second alignment treatment is performed prior to the first alignment treatment, the example 6 is the same as the example 5.

First, as shown in the upper side of FIG. 13, the mask MK including the shield portion LS corresponding to an area in which the first area A1 is to be formed and an aperture portion AP corresponding to an area in which the second area A2 is to be formed is prepared. The mask MK is provided so as to overlap with the alignment film 20. The mask MK may be in contact with the alignment film 20 or may be spaced apart from the alignment film 20. Then, the rubbing treatment is performed via the mask MK. The pile 90 of the rubbing cloth, which is in contact with the alignment film 20 via the aperture portion AP, rubs the surface of the alignment film 20 to form fine trench structures on the alignment film 20. The second areas A2 is formed by above process. Of the alignment film 20, areas overlapping with the shield portion LS are not in contact with the pile 90.

Next, as shown in the lower side of FIG. 13, the mask is detached and the first alignment treatment is performed for the alignment film 20 treated with the second alignment treatment. The area to which the first alignment treatment is performed is an area that overlaps with the shield portion LS and is not aligned in the second alignment treatment. The area that is not aligned in the second alignment treatment and the area to which the first alignment treatment is performed are overlap each other, and the first alignment treatment is performed. This area is formed as the first area A1 by performing the first alignment treatment by means of interference exposure.

Thus, the alignment film 20 including the first area A1 and the second area A2 can be obtained.

Example 7

Figure 14:
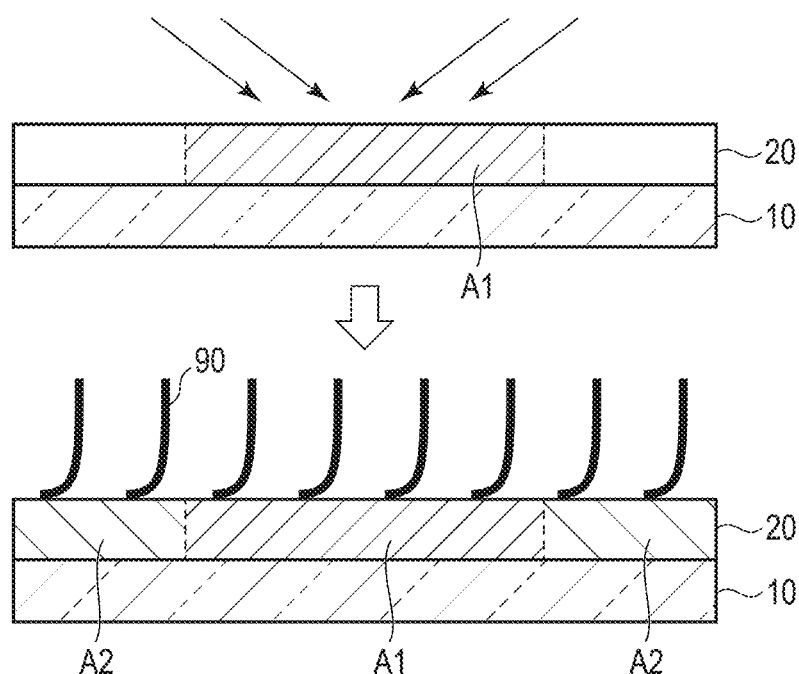
FIG. 14 is a cross-sectional view describing the first alignment treatment and the second alignment treatment in an example 7 of the manufacturing method of the liquid crystal optical element 1.

FIG. 14 is a cross-sectional view describing the first alignment treatment and the second alignment treatment in the example 7 of the manufacturing method of the liquid crystal optical element 1.

The example 7 is different from the example 6 in performing the second alignment treatment without a mask.

First, as shown in the upper side of FIG. 14, the first alignment treatment by means of the interference exposure is performed for a plurality of areas in the alignment film 20. This process forms the first area A1.

Then, the second alignment treatment is performed as shown in the lower side of FIG. 14.

In the second alignment treatment in the example 7, an alignment treatment with weak rubbing strength is preferable. Here, the weak rubbing strength corresponds to a strength which does not change the alignment treatment direction of the first area A1. As described above, the rubbing strength can be changed by varying the processing speed or the push-in quantity.

Thus, the alignment film 20 including the first area A1 and the second area A2 can be obtained.

Example 8

Figure 15:
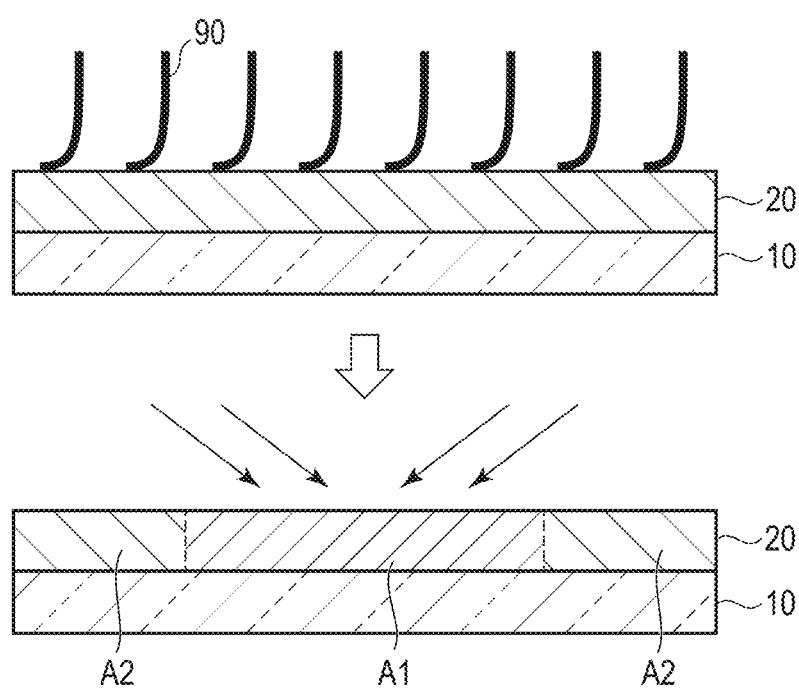
FIG. 15 is a cross-sectional view describing the first alignment treatment and the second alignment treatment in an example 8 of the manufacturing method of the liquid crystal optical element 1.

FIG. 15 is a cross-sectional view describing the first alignment treatment and the second alignment treatment in the example 8 of the manufacturing method of the liquid crystal optical element 1.

Other than the point that the second alignment treatment is performed prior to the first alignment treatment, the example 8 is the same as the example 7.

First, the second alignment treatment is performed as shown in the upper side of FIG. 15. Then, the first alignment treatment is performed as shown in the lower side of FIG. 15. Similarly to the example 7, an alignment treatment with weak rubbing strength is preferable in the second alignment treatment in the example 8.

Thus, the alignment film 20 including the first area A1 and the second area A2 can be obtained.

As explained above, the embodiments can provide a liquid crystal optical element in which increase in the area can be achieved.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element, comprising:
a substrate;
an alignment film provided on the substrate; and
a liquid crystal layer provided on the alignment film, wherein
the alignment film includes a plurality of first areas treated with an alignment treatment and a second area surrounding each of the plurality of first areas,
the liquid crystal layer includes:
   a first alignment area overlapping with the first area and including a plurality of first liquid crystal molecules forming an alignment pattern in which longitudinal axes of the first liquid crystal molecules successively vary; and
   a second alignment area overlapping with the second area and including a plurality of second liquid crystal molecules, longitudinal axes of the plurality of second liquid crystal molecules being arranged in the same direction,
the liquid crystal layer is cured in a state in which alignment directions of the plurality of first liquid crystal molecules and the plurality of second liquid crystal molecules are fixed, and
the liquid crystal layer contains a nematic liquid crystal.

2. A manufacturing method of a liquid crystal optical element, the method comprising:
forming an alignment film on a substrate;
performing a first alignment treatment of conducting an interference exposure for the alignment film by using a beam of a first circularly polarized light and a beam of a second circularly polarized light reverse to the first circularly polarized light;
performing a second alignment treatment in which the alignment film is exposed to a beam of a linearly polarized light; and
forming a liquid crystal layer on the alignment film.

3. The manufacturing method of claim 2, wherein
the first alignment treatment is performed for a plurality of areas of the alignment film prior to the second alignment treatment, and
the second alignment treatment is performed for the entire alignment film by covering the plurality of areas treated with the first alignment treatment with a mask.

4. The manufacturing method of claim 2, wherein
the second alignment treatment is performed for the entire alignment film prior to the first alignment treatment by covering a plurality of areas of the alignment film with a mask, and
the first alignment treatment is performed for the plurality of areas after removing the mask.

5. The manufacturing method of claim 2, wherein
the first alignment treatment is performed for a plurality of areas of the alignment film prior to the second alignment treatment,
the second alignment treatment is performed for the entire alignment film, and
an exposure amount in the second alignment treatment is smaller than an exposure amount in the first alignment treatment.

6. The manufacturing method of claim 2, wherein
the second alignment treatment is performed for the entire alignment film prior to the first alignment treatment,
the first alignment treatment is performed for a plurality of areas of the alignment film, and
an exposure amount in the second alignment treatment is smaller than an exposure amount in the first alignment treatment.

7. A manufacturing method of a liquid crystal optical element, the method comprising:
forming an alignment film on a substrate;
performing a first alignment treatment of conducting an interference exposure for the alignment film by using a beam of a first circularly polarized light and a beam of a second circularly polarized light reverse to the first circularly polarized light;
performing a second alignment treatment of rubbing the alignment film; and
forming a liquid crystal layer on the alignment film.

8. The manufacturing method of claim 7, wherein
the first alignment treatment is performed for a plurality of areas of the alignment film prior to the second alignment treatment, and
the second alignment treatment is performed for the entire alignment film by covering the plurality of areas treated with the first alignment treatment with a mask.

9. The manufacturing method of claim 7, wherein
the second alignment treatment is performed for the entire alignment film prior to the first alignment treatment by covering a plurality of areas of the alignment film with a mask, and
the first alignment treatment is performed for the plurality of areas after removing the mask.

10. The manufacturing method of claim 7, wherein
the first alignment treatment is performed for a plurality of areas of the alignment film prior to the second alignment treatment,
the second alignment treatment is performed for the entire alignment film, and
a rubbing strength of the second alignment treatment is weak such an extent not to affect the first alignment treatment.

11. The manufacturing method of claim 7, wherein
the second alignment treatment is performed for the entire alignment film prior to the first alignment treatment,
the first alignment treatment is performed for a plurality of areas of the alignment film, and
a rubbing strength of the second alignment treatment is weak such an extent not to affect the first alignment treatment.

* * * * *